No. 679,596. Patented July 30, 1901.
A. BONFIGLIETTI.
TIRE FOR WHEELED VEHICLES.
(Application filed July 1, 1901.)
(No Model.)
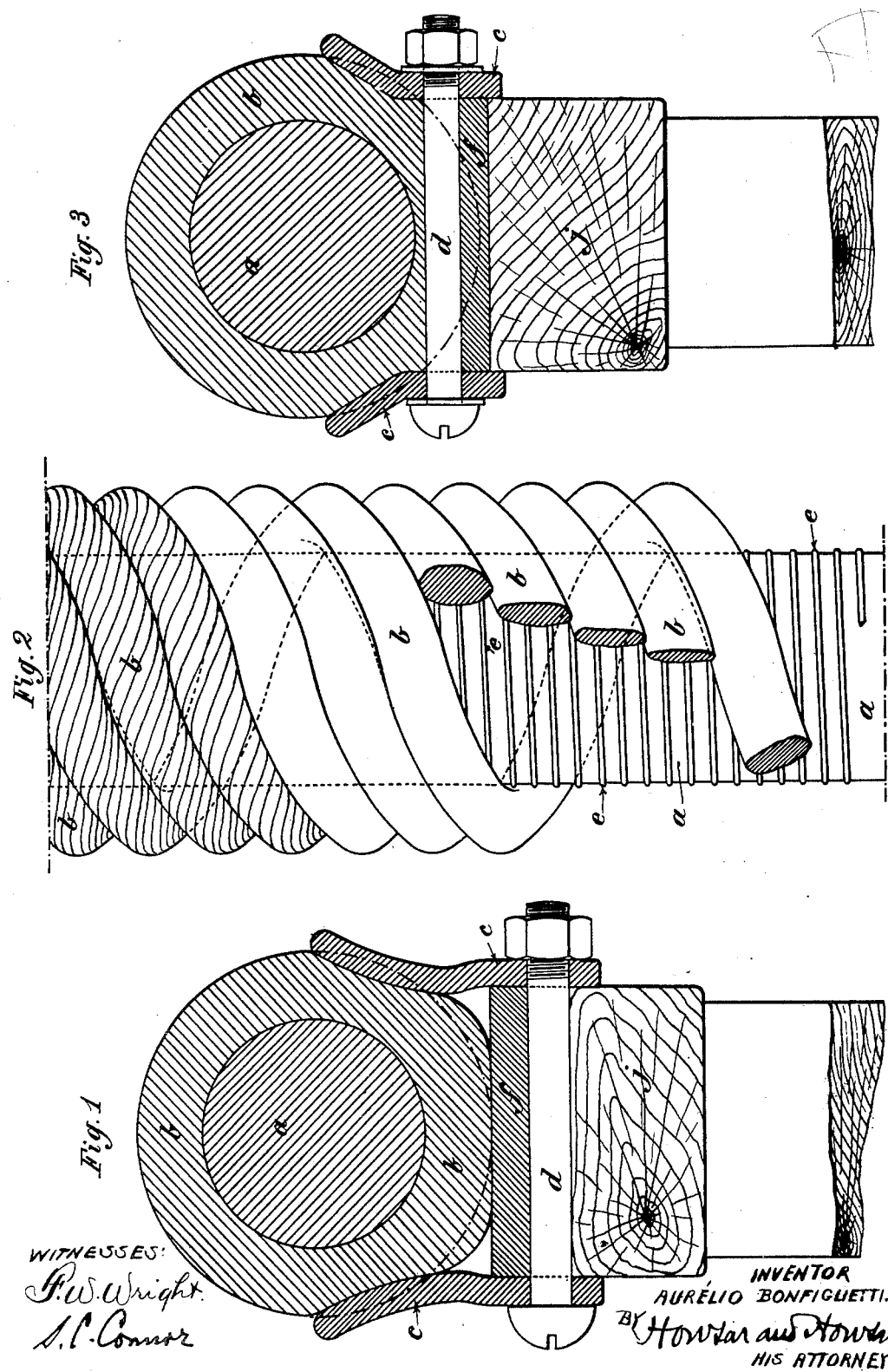
WITNESSES:
F. W. Wright.
S. C. Connor.
INVENTOR
AURELIO BONFIGLIETTI.
BY Howson and Howson
HIS ATTORNEYS.

UNITED STATES PATENT OFFICE.

AURELIO BONFIGLIETTI, OF PARIS, FRANCE.

TIRE FOR WHEELED VEHICLES.

SPECIFICATION forming part of Letters Patent No. 679,596, dated July 30, 1901.

Application filed July 1, 1901. Serial No. 66,723. (No model.)

*To all whom it may concern:*

Be it known that I, AURELIO BONFIGLIETTI, a subject of the King of Italy, and a resident of Paris, France, have invented an Improvement in Tires for Wheeled Vehicles, of which the following is a specification.

The present invention relates to an improved form of tire capable of being employed for wheels of vehicles in general, but the use of which is more particularly described in connection with the wheels of autocars of all kinds. Hitherto in order to make tires for these vehicles india-rubber, leather, and the like have been employed in various forms. Such tires are, however, costly, wear rapidly, and their coefficient of adherence to the ground is limited. These parts of the wheels play an important part in the working of autocars. It is therefore important to find a type which does not possess the drawbacks hereinbefore mentioned.

The improved tire which forms the object of the present application is elastic and resistant. It may be manufactured very economically, and, further, it has a much higher coefficient of adherence to the ground than the tires at present employed. It is formed of textile filaments, plaited or twisted, formed into strips or cords after a preliminary preparation, and arranged around a central core formed by filaments of the same nature. These filaments are of some suitable textile material, such as hemp, jute, ramie, cotton, manila, wool, hair, or the like.

The constitution of this improved tire is shown in the accompanying drawings, in which—

Figure 1 is a transverse section of the tire mounted on a wheel-rim. Fig. 2 shows a portion at the moment of manufacture. Fig. 3 is a modification of the method of fixing the tire on the rim.

In view of the new application which is made of them the filaments undergo the following special treatment: The filaments intended to form the core are first dried and then immersed in a solution intended to preserve them, such as oils, tar, and the like. In this way a torus or core $a$ is formed with these filaments held in position by a flexible band $e$, metallic wire, or the like, as shown in Fig. 2 of the drawings. The cord serving as cover is preferably formed of rope-yarn immersed separately in linseed-oil holding in suspension a certain quantity of minium (red lead) and white lead. The cord being plaited with these threads impregnated with agglutinant substance thus becomes itself penetrated at all points by the said substance, so that the filaments adhere one upon the other and cannot separate. This cord $b$ is wound around the core in the form of a spiral with wide volutes and with several turns. As Fig. 2 shows, the winding is done in such a way that the spirals are closely juxtaposed. The tire thus completed is mounted under pressure on the felly $j$ of the wheel covered with its metallic rim $f$.

This tire is held in its place by means of metal crowns $c$, placed on each side and strongly pressed against the rim $j$ and the tire by bolts $d$.

In the arrangement shown in Fig. 1 the fastening-bolts $d$ pass through the wooden felly $j$. In the modification shown in Fig. 3, on the contrary, these bolts are introduced between the rim $f$ and the tire, lifting this latter. This second arrangement affords the advantage of not weakening the felly by holes being bored therein and of allowing it to be fitted to an existing wheel without necessitating the latter undergoing any preparation.

It is easy to understand the superiority of a tire thus manufactured over those at present employed, both as regards its own resistance and its cost of production.

I declare that what I claim is—

An improved tire for wheels of vehicles consisting of suitable textile filaments which have been treated to preserve them, plaited, twisted or otherwise, and wound in juxtaposed spirals around a central core of similar material, substantially as hereinbefore specified.

In testimony whereof I have signed my name to this specification in the presence of two subscribing witnesses.

AURELIO BONFIGLIETTI.

Witnesses:
   JOSEPH DEBAGE,
   EDWARD MACLEAN.